United States Patent
Thuries et al.

(10) Patent No.: US 10,997,346 B2
(45) Date of Patent: May 4, 2021

(54) CONCEPTION OF A 3D CIRCUIT COMPRISING MACROS

(71) Applicant: Commissariat à l'Énergie Atomique et aux Énergies Alternatives, Paris (FR)

(72) Inventors: Sébastien Thuries, Grenoble (FR); Olivier Billoint, Grenoble (FR); Didier Lattard, Grenoble (FR); Pascal Vivet, Saint Paul de Varces (FR)

(73) Assignee: Commissariat à l'Énergie Atomique et aux Énergies Alternatives, Paris (FR)

( * ) Notice: Subject to any disclaimer, the term of this patent is extended or adjusted under 35 U.S.C. 154(b) by 0 days.

(21) Appl. No.: 16/443,509

(22) Filed: Jun. 17, 2019

(65) Prior Publication Data
US 2019/0384884 A1    Dec. 19, 2019

(30) Foreign Application Priority Data
Jun. 18, 2018    (FR) ...................................... 1855326

(51) Int. Cl.
G06F 30/392    (2020.01)
G06F 30/327    (2020.01)
G06F 119/18    (2020.01)

(52) U.S. Cl.
CPC .......... *G06F 30/392* (2020.01); *G06F 30/327* (2020.01); *G06F 2119/18* (2020.01)

(58) Field of Classification Search
CPC .. G06F 30/392; G06F 30/394; G06F 30/3947; G06F 30/3953
See application file for complete search history.

(56) References Cited

U.S. PATENT DOCUMENTS

| | | | | |
|---|---|---|---|---|
| 2009/0319968 A1* | 12/2009 | Wang | ..................... | G06F 30/39 716/106 |
| 2014/0137061 A1* | 5/2014 | McIlrath | ................. | G06F 30/39 716/112 |
| 2015/0199464 A1* | 7/2015 | Sproule | ................. | G06F 30/392 716/122 |

(Continued)

OTHER PUBLICATIONS

Preliminary Search Report for French Application No. 1855326, dated Feb. 11, 2019.

(Continued)

*Primary Examiner* — Stacy Whitmore
(74) *Attorney, Agent, or Firm* — Wolf, Greenfield & Sacks, P.C.

(57) ABSTRACT

A method of 3D circuit conception comprising: providing, to a circuit conception tool, circuit design files representing a 3D circuit design including one or more first circuit elements attributed to a first tier of the 3D circuit and one or more second circuit elements attributed to a second tier of the 3D circuit; modifying, by the circuit conception tool, a property of the one or more first and/or second circuit elements to permit any of the second circuit elements to superpose, or be superposed by, any of the first circuit elements; and performing, by the circuit conception tool, placement and routing of the 3D circuit design based on a 2D circuit representation, interconnection nodes of the one or more second circuit elements being defined in one or more interconnection levels of the 2D circuit representation.

15 Claims, 7 Drawing Sheets

(56) References Cited

U.S. PATENT DOCUMENTS

2015/0205903 A1     7/2015   Or-Bach et al.
2016/0042110 A1     2/2016   Lim et al.

OTHER PUBLICATIONS

Panth et al., Shrunk-2-D: A Physical Design Methodology to Build Commercial-Quality Monolithic 3-D ICs. IEEE Transactions on Computer-Aided Design of Integrated Circuits and Systems. Oct. 2017;36(10):1716-24.

Dreslinski et al., Centip3De: A 64-Core, 3D Stacked Near-Threshold System. IEEE Micro. Mar. 2013;33(2):8-16.

Kim et al., 3D-Maps: 3D Massively Parallel Processor With Stacked Memory. IEEE ISSCC 2012 Presentation. 2012, 31 pages.

\* cited by examiner

CONCEPTION OF A 3D CIRCUIT COMPRISING MACROS

The present patent application claims priority from the French patent application filed on Jun. 18, 2018 and assigned application no. FR18/55326, the contents of which is hereby incorporated by reference.

FIELD

The present disclosure relates to the field of 3D circuit designs, and in particular to a method and computing device for generating a 3D circuit layout using a 2D circuit conception tool.

BACKGROUND

During the conception of an integrated circuit comprising millions of transistors, a key phase of the design process is the physical implementation operation involving circuit synthesis and "place and route". During this operation, a file representing the circuit to be fabricated, such as a GDS (graphic database system) file, is generated by a dedicated conception tool. The conception tool for example performs circuit synthesis in order to generate a gate-level implementation, and then places the cells of the circuit design on the available surface of the integrated circuit. A routing algorithm is then applied that interconnects the cells of the circuit design in order to create a circuit layout.

3D circuits, in which cells are positioned on multiple stacked tiers interconnected by interconnections such as 3D vias, provide many advantages in terms of circuit compactness and performance.

There are various technologies that can be employed for fabricating 3D circuits. For example, some of these technologies are based on the fabrication of several 2D circuits, which are then stacked in a face-to-face, face-to-back, or back-to-back arrangement, or stacked using a mix of these interfaces. The "face" of an integrated circuit corresponds to the side closest to the metal interconnection levels, while the "back" corresponds to the side closest to the substrate, generally formed of silicon.

Another technology, known as monolithic 3D transistor technology, and also known as sequential 3D and Cool-Cube™, involves the fabrication of a plurality of tiers of transistors as a single block. In particular, two or more tiers of transistors are formed sequentially, and interconnected by vertical 3D vias, corresponding to a face-to-back arrangement. For example, this technology is described in more detail in the publication by P. Batude et al. entitled "3D sequential integration opportunities and technology optimization", IEEE International Interconnect Technology Conference, 2014, pages 373-376. An advantage of monolithic 3D technology is that the silicon thicknesses of each tier can be relatively small, permitting a high density of interconnections between tiers.

A problem for 3D circuit design is that existing software tools implementing place and route have been developed for 2D circuits, and are not compatible with the generation of high-density 3D circuit designs. Furthermore, creating a new design tool configured for 3D circuit design would be time consuming and costly.

United States patent application published as US2016/042110 relates to a method of designing a multi-tier three-dimensional integrated circuit. This method is based on shrinking cells and wires, leading to several drawbacks described in more detail below.

There is thus a need in the art for a circuit design method and device permitting the conception of 3D circuits having relatively high density.

SUMMARY

It is an aim of embodiments of the present description to at least partially address one or more needs in the prior art.

According to one aspect, there is provided a method of 3D circuit conception comprising: providing, to a circuit conception tool, circuit design files representing a 3D circuit design including one or more first circuit elements attributed to a first tier of the 3D circuit and one or more second circuit elements attributed to a second tier of the 3D circuit; modifying, by the circuit conception tool, a property of the one or more first and/or second circuit elements to permit any of the second circuit elements to superpose, or be superposed by, any of the first circuit elements; performing, by the circuit conception tool, placement and routing of the 3D circuit design to generate a 3D circuit layout of the 3D circuit design, wherein the placement and routing is based on a 2D circuit representation, interconnection nodes of the one or more second circuit elements being defined in one or more interconnection levels of the 2D circuit representation, the placement comprising placing one or more of the second circuit elements to at least partially superpose one or more of the first circuit elements and the routing comprising routing connections between the one or more first circuit elements and the one or more second circuit elements via the interconnection nodes defined in the one or more interconnection levels; and generating a final 3D circuit layout by extracting, from the 3D circuit layout, a first circuit layout of the first tier comprising the one or more first circuit elements and a second circuit layout of the second tier comprising the one or more second circuit elements.

According to one embodiment, the method further comprises: transmitting the final 3D circuit layout of the 3D circuit design to a manufacturing site for fabrication.

According to one embodiment, the method further comprises fabricating a 3D circuit design based on the final 3D circuit layout.

According to one embodiment, the method further comprises, after performing placement and routing, performing by the circuit conception tool, post-routing optimization of the placement of at least one of the first or second circuit elements.

According to one embodiment, modifying the property of the one or more first and/or second circuit elements to permit any of them to superpose, or be superposed by, any of the first circuit elements comprises defining an overlap layer in each of the one or more second circuit elements, the overlap layer defining a region of each second circuit element that can be superposed by other circuits.

According to one embodiment, modifying the property of the one or more first and/or second circuit elements to permit any of them to superpose, or be superposed by, any of the first circuit elements comprises defining each of the second circuit elements as a cover class.

According to one embodiment, the method further comprises, prior to providing the circuit design files to the circuit conception tool, attributing, by the circuit conception tool, the one or more first circuit elements to the first tier of the 3D circuit and one or more second circuit elements to the second tier of the 3D circuit.

According to one embodiment, the interconnection nodes of the one or more second circuit elements are 3D interconnection PADs, and the one or more interconnection levels is a hybrid bonding layer.

According to one embodiment, interconnection nodes of the one or more first circuit elements are each defined in one of a first set of metal levels of the 2D circuit representation corresponding to metal levels of the first tier; and interconnection nodes of the one or more second circuit elements are each defined in one of a second set of metal levels of the 2D circuit representation corresponding to metal levels of the second tier.

According to one embodiment, the at least one first circuit element comprises one or more macros, and the at least one second circuit element comprises one or more logic cells.

According to one embodiment, the one or more macros are defined in the circuit design files as being encapsulated in a top level in which the 3D interconnection pads are present.

According to one embodiment, the 3D circuit layout comprises one or more tiers comprising only said macros.

According to one embodiment, the method further comprises, prior to performing the placement and routing, a synthesis operation during which a functional definition of a logic circuit of the 3D circuit design is translated into a netlist defining said one or more logic cells.

According to one embodiment, the synthesis operation is based on a pre-placement of the one or more macros in a 3D floorplan.

According to a further aspect, there is provided a method of 3D circuit conception comprising: providing, to a circuit conception tool, circuit design files representing a 3D circuit design including one or more macros each including a property permitting it to be superposed by other circuit elements; performing, by the circuit conception tool, placement and routing of the 3D circuit design to generate a 3D circuit layout of the 3D circuit design, the placement and routing comprising at least partially superposing one or more logic cells over the one or more macros and routing connections between the one more logic cells and 3D interconnection pads defined on faces of the one or more macros; and generating a final 3D circuit layout by extracting, from the 3D circuit layout, a first circuit layout of a first tier comprising the one or more logic cells and a second circuit layout of a second tier comprising the one or more macros.

According to one embodiment, the method further comprises: transmitting the final 3D circuit layout of the 3D circuit design to a manufacturing site for fabrication.

According to one embodiment, the method further comprises fabricating a 3D circuit design based on the final 3D circuit layout.

According to one embodiment, the one or more macros each include an overlap layer defining a region of each macro that can be superposed by other circuits.

According to one embodiment, the one or more macros are defined in the circuit design files as being encapsulated in a top level in which the 3D interconnection pads are present.

According to one embodiment, the 3D circuit layout comprises one or more tiers comprising only said macros.

According to one embodiment, the method further comprises, prior to performing the placement and routing, a synthesis operation during which a functional definition of a logic circuit of the 3D circuit design is translated into a netlist defining said one or more logic cells.

According to one embodiment, the synthesis operation is based on a pre-placement of the one or more macros in a 3D floorplan.

According to a further aspect, there is provided a circuit conception system comprising: one or more processors; and one or more memories storing software instructions that cause the one or more processors to implement the above method.

According to a further aspect, there is provided a non-transitory storage medium storing software instructions that cause the above method to be implemented when the instructions are executed by one or more processors.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION

United States patent application published as US2016/0042110 describes a technique for generating a 3D design having two tiers by shrinking the dimensions of the standard cells such that their area is reduced by a factor of two, and then using a 2D tool to perform place and route. The dimensions of the standard cells are then returned to normal, the circuit is partitioned into the two tiers, and then routing is performed per tier.

A drawback of the technique of US2016/042110 is that placement of standard cells of reduced dimensions cannot lead to a precise placement, and if the supply voltage rails of the circuit remain at fixed positions, it is not clear how the placement could be performed to fit twice the number of shrunk cells into the area of a single tier. Furthermore, the routing is performed per tier, meaning that it is hard to see how the inter-tier routing can be optimized according to this technique, and it is also not possible to perform post-routing placement optimization based on the global design.

Figure 1:
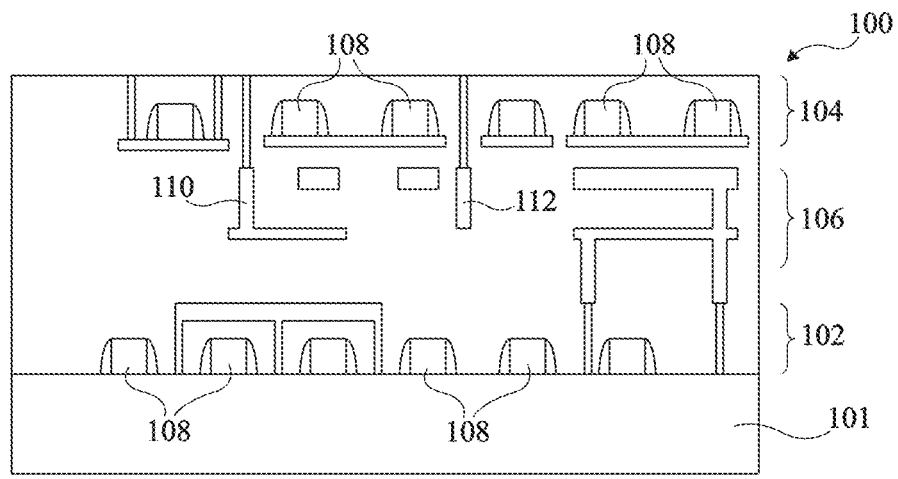
FIG. 1 is a cross-section view of a 3D circuit according to an example of a face-to-back arrangement.

FIG. 1 is a cross-section view of a monolithic 3D circuit 100 according to an example embodiment. The circuit 100 for example comprises a tier 102 of transistors formed on a handle layer 101, and a further tier 104 of transistors formed over the tier 102. An intermediate metal interconnection layer 106 for example serves to provide interconnections between transistor devices 108 of the tiers 102, 104. While not illustrated in FIG. 1, a further metal interconnection layer could be provided above the tier 104. Examples of 3D vias 110, 112 are also illustrated, known as a monolithic inter-tier vias (MIV).

More generally, a 3D circuit is considered herein to be a circuit having any plurality of tiers stacked one upon the other, each tier having a transistor layer, in other words an active layer in which transistor devices are formed, and an interconnection layer in which interconnections between the transistor devices, and from the transistor devices to one or more other tiers, are formed.

Figure 2:
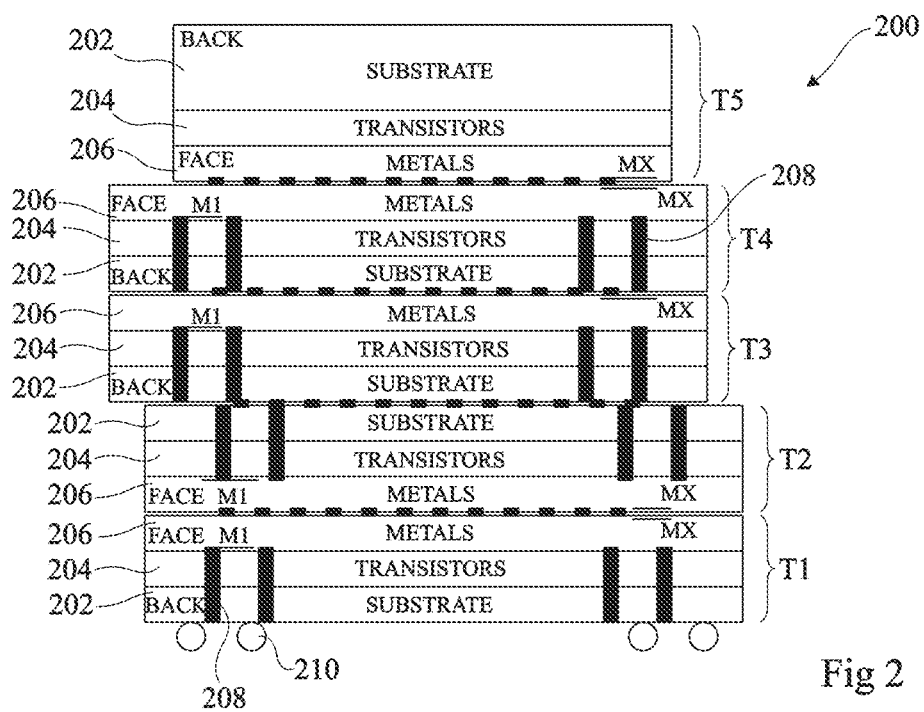
FIG. 2 is a cross-section view of a stack of integrated circuits according to an example.

FIG. 2 is a cross-section view of 3D circuit 200 comprising a stack of integrated circuits, including face-to-face, back-to-back, and back-to-face interfaces between the circuits top sides (FACE) and undersides (BACK) of the circuits. In the example of FIG. 2, there are five integrated circuits forming corresponding tiers labelled T1 (bottom tier) to T5 (top tier). Each integrated circuit for example comprises a substrate layer (SUBSTRATE) 202 formed for example of silicon, a transistor layer (TRANSISTORS) 204 or FEOL (front end of line) and a metal interconnection layer (METALS) 206 or BEOL (back end of line) comprising one or more metal levels, of which examples of layers M1 and MX are represented in FIG. 2.

Of course, the transistor layer 204 may include devices other than transistors, and the devices of the transistor layer are generally formed partially in and particular over the silicon substrate 202. It will also be apparent to those skilled in the art that the metal interconnection layer 206 corresponds to a layer of dielectric material in which levels of metal in defined patterns have been formed in order to provide connections between the transistors or other devices formed in the transistor layer.

The substrates 202 of the tiers T1 to T4 have for example been thinned. Where the back side is used as the interface, TSVs (through silicon vias) 208 are for example used to form connections between the metal layer 206 and the back side. The bottom tier T1 in the stack for example comprises bumps 210 for connecting the stack to a circuit board (not illustrated in FIG. 2).

Figure 3A:
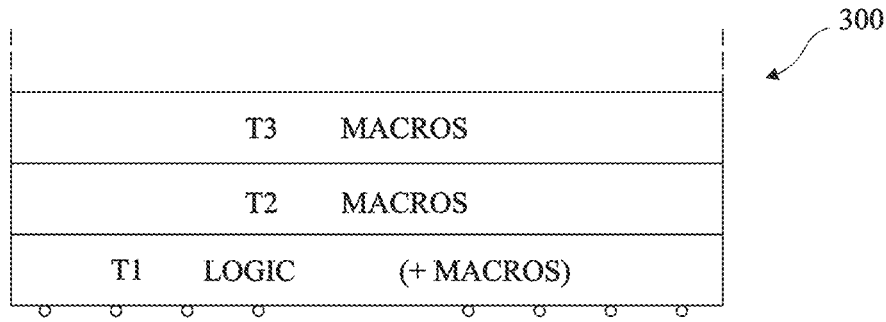
FIG. 3A illustrates a 3D circuit according to an example embodiment of the present disclosure.

FIG. 3A illustrates a 3D circuit 300 according to an example embodiment of the present disclosure. The 3D circuit 300 can for example be considered as a high density 3D circuit, implying a 3D circuit comprising a stack of tiers (dies or layers in a monolithic circuit) in which 3D vias have a diameter of 5 µm or less.

The present inventors have noticed that in digital circuits or mixed digital/analog circuits, the surface area occupied by logic cells, i.e. standard cells, is generally up to 50 percent. The rest is occupied by larger macros, sometime referred to as IP (intellectual property) circuits.

As known by those skilled in the art, logic cells are relatively small circuits comprising digital logic devices that are used to implement Boolean logic functions, such as AND, OR, NOR, XOR and XNOR gates, or basic storage functions, such as latches and flip-flops. These logic cells are generated by the circuit conception tool during a synthesis operation based on code defining the functionality of the logic cells, for example in the form of RTL (Register Transfer Level) code. Each logic cell is for example selected from a library of standard cells, and the selection, during the circuit synthesis, of the particular standard cell for implementing each logic function may be based not only on the logic function, but also on other factors such as the available surface area, the positioning of the macros and other logic cells, etc. In some embodiments, this selection may be modified during the place and route operation.

As also known in the art, macros are generally larger circuits that may comprise logic cell circuits, memories and/or other circuitry including analog circuits. The design of a macro, including the positioning within the macro of the various cells of the macro and the interconnections between these cells, can be considered to be fixed, in other words it is not modified during the circuit synthesis and place and route operations.

As represented in FIG. 3A, according to embodiments of the present disclosure, the 3D circuit 300 is for example designed to have one of its tiers, the bottom tier T1 in the example of FIG. 3A, containing only logic cells, or a mixture of logic cells and some macros (LOGIC (+MACROS)), and to have one or more other tiers containing only macros. In the example of FIG. 3A, there are tiers T2 and T3 containing only macros (MACROS).

The 3D circuit 300 could for example be formed using sequential 3D monolithic technology as described above in relation with FIG. 1, which corresponds to using back-to-face interfaces between the tiers. Alternatively, it could be formed by stacking two or more integrated circuits using back-to-back, face-to-face, and/or back-to-face interfaces, as described above in relation to FIG. 2, or by a mixture of the technologies of FIGS. 1 and 2. Furthermore, in the case that two or more integrated circuits are stacked, each of these circuits can be formed using a different transistor and metallization (Back End of Line) technology.

Figure 3B:
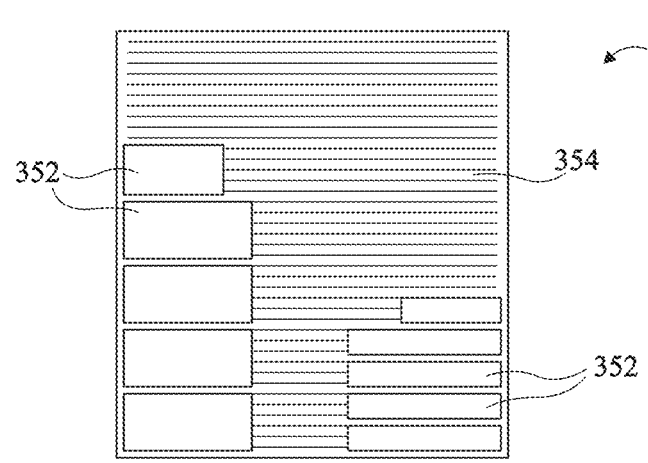
FIG. 3B is a plan view of a 2D circuit design comprising logic cells and macros.

FIG. 3B is a plan view illustrating an example of a design layout 350 that has been generated assuming that the circuit design is to be generated as a 2D circuit. The circuit design for example comprises macros 352, ten of which having various sizes are present in the example of FIG. 3B. A logic circuit 354 formed of standard cells, represented by horizontal lines in FIG. 3B, is implemented in the space surrounding the macros 352.

Figure 3C:
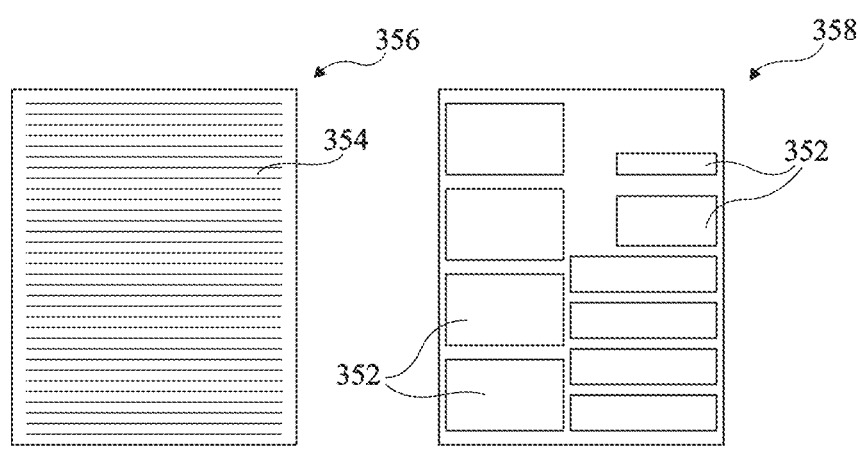
FIG. 3C is a plan view of layers of a 3D circuit design comprising a layer of logic cells and a further layer of macros.

FIG. 3C is a plan view illustrating an example of a 3D design layout of the circuit design of FIG. 3B, comprising two levels, a bottom level 356 of logic and an upper level 358 of macros. In particular, the level 356 for example comprises some or all of the logic circuit 354, while the level 358 for example comprises all of the macros 352.

Figure 4:
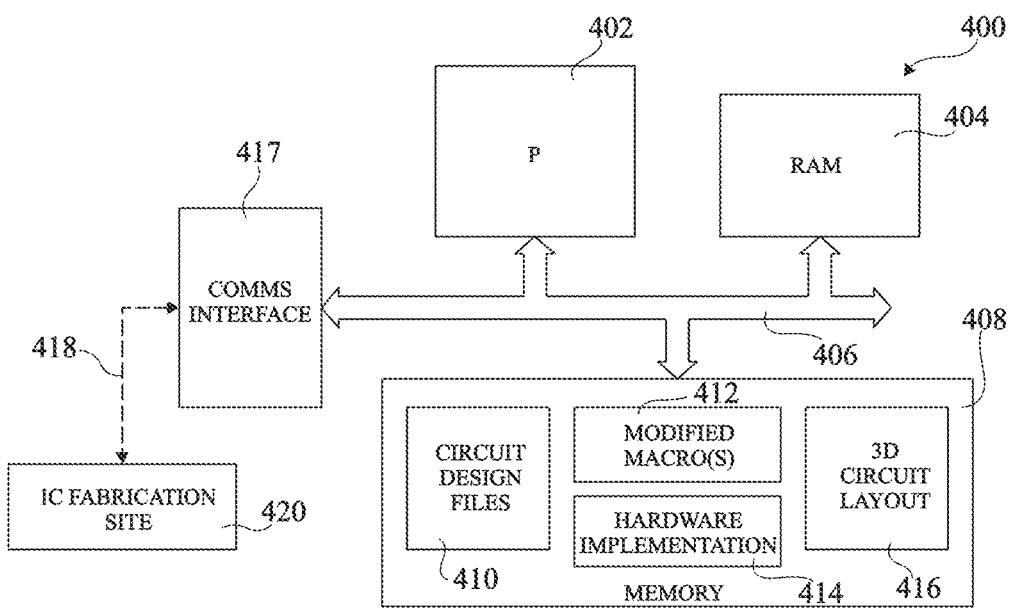
FIG. 4 schematically illustrates a 3D circuit conception system according to an example embodiment of the present disclosure.

FIG. 4 schematically illustrates a 3D circuit conception system 400 adapted to implement a method of 3D circuit conception, for example the conception of a 3D circuit like the one of FIG. 3A or 3C.

The system 400 for example comprises one or more processors (P) 402 under control of instructions stored in an instruction memory 404, which is for example a RAM, although in alternative embodiments it could be another type of memory such as a FLASH. For example, the one or more processors 402 are coupled, via a bus 406, to the memory 404 and also to a further memory (MEMORY) 408. The memory 408 is for example a non-volatile memory storing circuit design files (CIRCUIT DESIGN FILES) 410 representing macros and standard cells to be implemented in the 3D circuit. During the 3D circuit conception, the memory 408 also for example stores one or more modified macros (MODIFIED MACRO(S)) 412, a hardware implementation (HARDWARE IMPLEMENTATION) 414 of the circuit design resulting from synthesis of the circuit design files 410, and the 3D circuit layout (3D CIRCUIT LAYOUT) 416 resulting from placement and routing applied to the hardware implementation 414. In some embodiments, the memories 404 and 408 could be implemented in a same memory device.

The system 400 further comprises a communications interface (COMMS INTERFACE) 417, for example coupled to the bus 406, and via which the 3D circuit layout can be transmitted, for fabrication, to an integrated circuit fabrication site or semiconductor foundry (IC FABRICATION SITE) 420, via a communications link 418 comprising for example the internet.

Of course, while not represented in FIG. 4, the system 400 could additionally comprise one or more user input devices, such as a keyboard, mouse, etc., one or more output devices such as a display.

The memory 404 and/or the memory 408 for example store computing instructions for controlling the one or more processors 402 to perform a method of 3D circuit conception, including for example steps of circuit synthesis and of place and route. This combination of software and processing resources will be designated herein as a 3D circuit conception tool.

A method of generating a 3D circuit layout using the 3D circuit conception tool of FIG. 4 will now be described in more detail with reference to FIG. 5.

Figure 5:
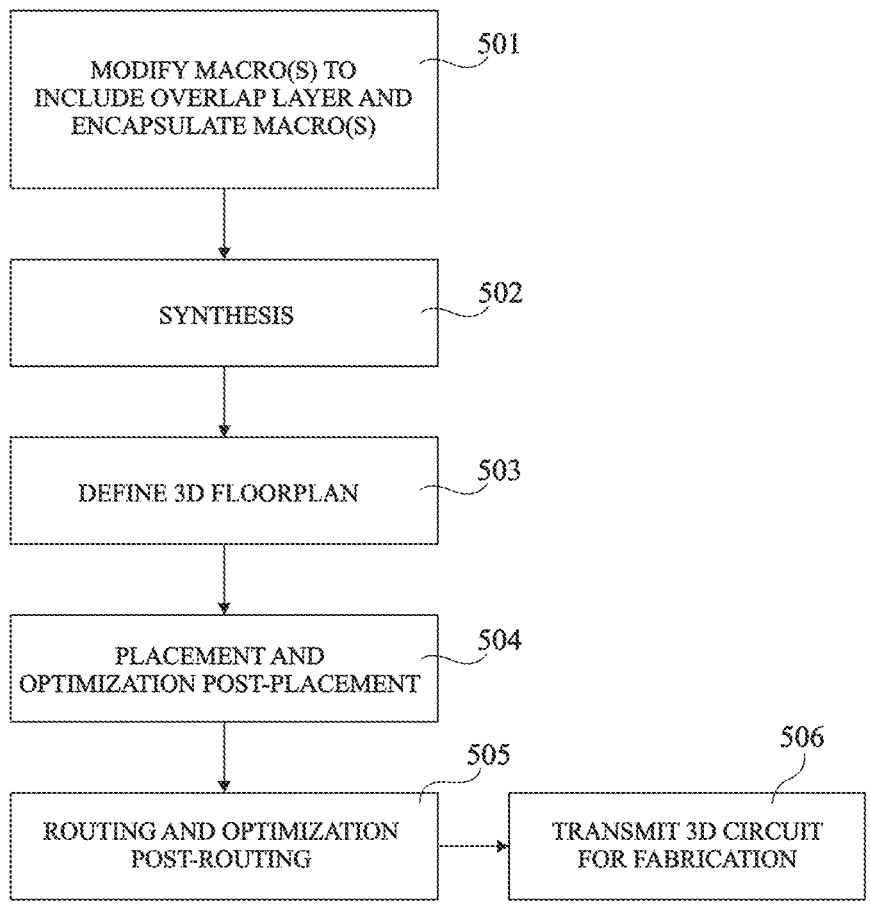
FIG. 5 is a flow diagram representing operations in a method of 3D circuit conception according to an example embodiment of the present disclosure.

FIG. 5 is a flow diagram illustrating an example of operations in a method of 3D circuit conception according to an example embodiment of the present disclosure. In particular, the 3D circuit is for example defined by a circuit layout of each tier of the 3D circuit, represented for example in the GDS (General Design Specification) or OASIS (Open Artwork System Interchange Standard) format. At least some of the operations of this method are implemented by the 3D circuit conception tool of FIG. 4, except the operation 503, which is for example implemented by an operator of the conception tool. The 3D circuit conception tool of FIG. 4 for example operates based on a 2D circuit representation, comprising the circuit elements of two tiers superposed with respect to each other.

It is assumed that initially the macros and standard cells of the circuit design are represented by the circuit design files 410 of FIG. 4, and these files have been loaded to the memory 408. The circuit design files 410 may for example be in Verilog or VHDL (VHSIC Hardware Description Language, where VHSIC stands for Very High Speed Integrated Circuit) and may for example include:
  one or more LEF (Library Exchange Format) files containing the standard cell and macro information for the design;
  one or more LIB (Liberty) timing files defining timing models of the standard cells and macros;
  a DEF (Design Exchange Format) file defining placement information of the macros and standard cells, and of the I/O pins, and other physical components; and
  one or more RTL files.

In an operation 501, physical properties of the circuit designs of one or more macros and/or standard cells (hereafter "cells/macros" or "cell/macro") to be included in the 3D circuit design are modified, while respecting the targeted 3D technology, and in particular, the pitch and diameter of 3D vias. For example, this involves a computer-implemented operation of modifying a LEF file associated with each cell/macro to generate a file "LEF-3D", and modifying a LIB file associated with each cell/macro to generate a file "LIB-3D".

This modification for example involves:
  adding an "overlap" property to the cell/macro;
  shifting pins of the cell/macro to a top interconnection layer of the device, e.g. to the HB (hybrid bonding) layer, in order to maintain cell/macro pin connectivity and provide 3D vertical routing into the 2D logic design during place and route; and
  encapsulating the cell/macro.

As will be described in more detail below, following these modifications, place and route can be performed on the logic dies with the .lib-3D and .lef-3D files in order to achieve a relatively well-optimized physical implementation of the 3D logic die.

As known by those skilled in the art, the overlap property renders a circuit superposable by other elements, and can be used to permit free space within a 2D circuit design to be rendered available. The present inventors propose to exploit this overlap property to permit standard 2D circuit place and route algorithms to be used for 3D circuit conception. In particular, in the present disclosure, the addition of the overlap property is used to render the cell/macro superposable by other elements such as standard cells, for example by modification of the LEF file of the cell/macro. The overlap is for example defined as extending across the entire surface of the cell/macro. In other words, the entire cell/macro is defined as being superposable by other circuits during the place and route operation.

The term "superpose" is used herein to designate the placing of one element in the space occupied by another element in a 2D circuit representation of the circuit design. This superposing may occur when an element attributed to one tier is positioned in the space occupied by an element attributed to the other tier, or vice versa.

The operation of defining the overlap layer will now be described in more detail with reference to FIG. 6A.

Figure 6A:
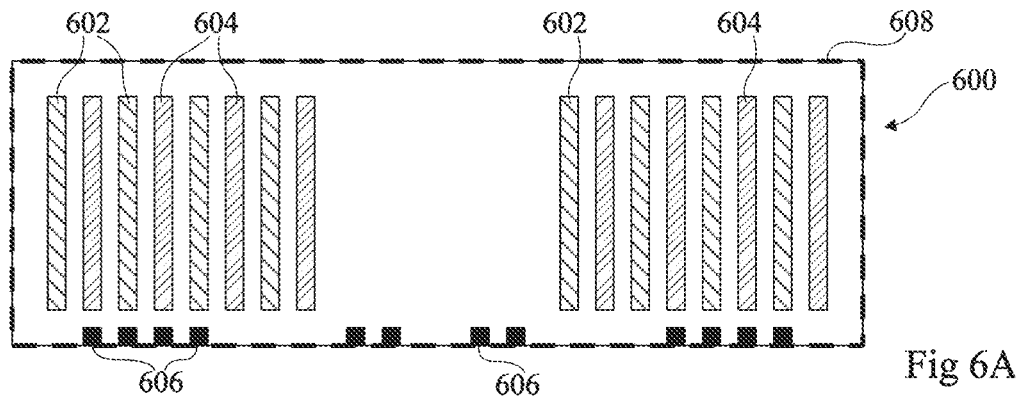
FIG. 6A is a plan view of a macro comprising an overlap layer.

FIG. 6A is a plan view of a macro according to an example embodiment, which for example represents a memory circuit. This circuit comprises ground pins 602, supply voltage pins 604, and signal pins 606. A dashed rectangle 608 in FIG. 6A represents the overlap layer, in other words the zone in which overlap of the macro is permitted. This region is for example defined by its boundary, which in the example of FIG. 6A corresponds to the boundary of the macro. This region is for example designated as an overlap layer by an indication in the properties of this region that it should be considered as an overlap layer, for example by asserting an appropriate flag. While in the example of FIG. 6A the layer 608 extends across the entire surface of the macro, in other embodiments, some regions of the macro could remain outside the region covered by the overlap layer, for example to allow 3D vias to pass through these regions.

Referring again to FIG. 5, operation 501 also for example involves encapsulating the one or more cells/macros in the top level of the device, i.e. in the top of the BEOL stack of the circuit, which in some embodiments is a hybrid bonding (HB) layer. Thus, the entire encapsulated cell/macro becomes an overlap layer that can be superposed by other circuit elements. Furthermore, by encapsulating each cell/macro in the top layer of the BEOL stack, this forces the circuit conception tool to perform routing to and from each cell/macro via the connections defined in this layer, rather than passing through lower metal levels.

Furthermore, all input and output pins, including the signal pins and power pins, are shifted to a top face of the device, for example the HB layer, and are transformed into a suitable layout for implementing 3D interconnection pads. An example of the implementation of this operation will now be described in more detail with reference to FIG. 6B.

Figure 6B:
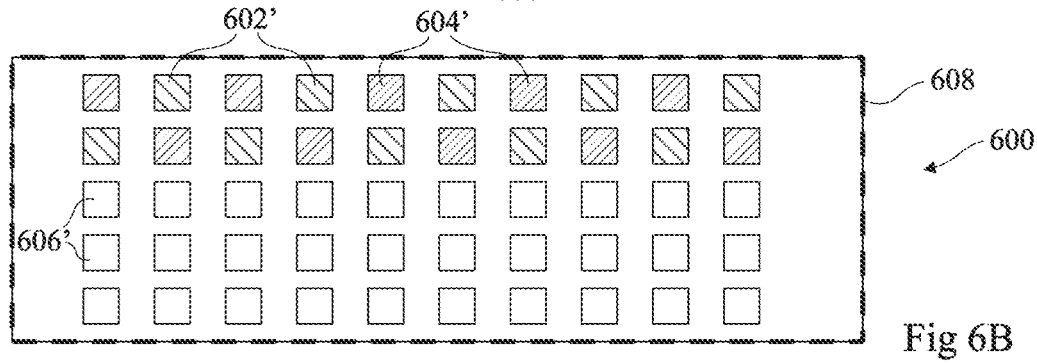
FIG. 6B is a plan view of 3D interconnection pads of the macro of FIG. 6A.

FIG. 6B is a plan view of the macro 600 following the encapsulation of the macro in the metal layer of the device, and the transfer of the power pins 602, 604 and signal pins 606 to a top level of the metal layer, such as the HB level. The new bonding pads replacing the pins 602, 604 and 606 are labelled 602', 604' and 606' respectively in FIG. 6B. Furthermore, the electrical characterization of the macro, including the signal timing, power dissipation, etc. defined for example in the LIB file associated with the macro, is for example modified based on the new bonding pads and connections to these pads. These modifications are all for example computer-implemented operations that can be achieved using designer scripts that depend on the targeted 3D interconnect pitch and diameter and in some cases on the power grid mesh properties, e.g. the size and pitch of the stripes of the power grid mesh.

While the operation 501 of FIG. 5 is based on an example in which an overlap property is used to permit macros, or standard cells, formed in one tier to be superposed by cells of another tier during placement, other types of library modification could be applied in order to achieve the same or a similar result. For example, the cells of a LEF file of a design library are known to be classed as either "STANDARD" cells, "COVER" cells, "BLOCK" cells, or "CORE" cells. The class of "cover" cell is used for example to permit a device, such as a MOM (metal-oxide-metal) capacitor, to be positioned in one of the metal levels over a standard cell formed in the transistor layer below. However, the present inventors propose to exploit this class in order to permit a logic cell or macro to be defined as a device that can entirely or partially superpose one or more standard cells or macros.

Referring again to FIG. 5, in an operation 502, circuit synthesis is performed in the similar manner as for 2D circuit conception. This for example involves processing the circuit design files 410 of FIG. 4 in order to generate a hardware implementation of the circuit design ready for placement and routing. For example, one or more RTL files representing logic functions are transformed into one or more netlists defining gate-level hardware implementations.

In some embodiments, the circuit synthesis may be based not only on the circuit design of the logic circuit, but also on the modified macros generated in operation 501. Indeed, while the macros may themselves not be modified during the circuit synthesis, certain physical aspects of the macros may impact the circuit synthesis of the logic circuit. Furthermore, in some embodiments, the synthesis may be based in part on a floorplan representing a pre-placement of the macros generated in operation 503, as will now be described.

In the operation 503, a 3D floorplan is for example defined for the 3D circuit. The 3D floorplan for example comprises a single tier having the dimensions and surface area of one of the tiers of the final 3D circuit layout. The 3D floorplan for example provides a pre-placement of the macros of the 3D circuit. This pre-placement is for example defined by an operator using an appropriate software application, or is supplied to the circuit conception tool in the form of an electronic file. In some embodiments, voltage supply rails of the circuit design are also pre-placed during this operation. An example of the pre-placement of macros in the design will now be described in more detail with reference to FIG. 7A.

Figure 7A:
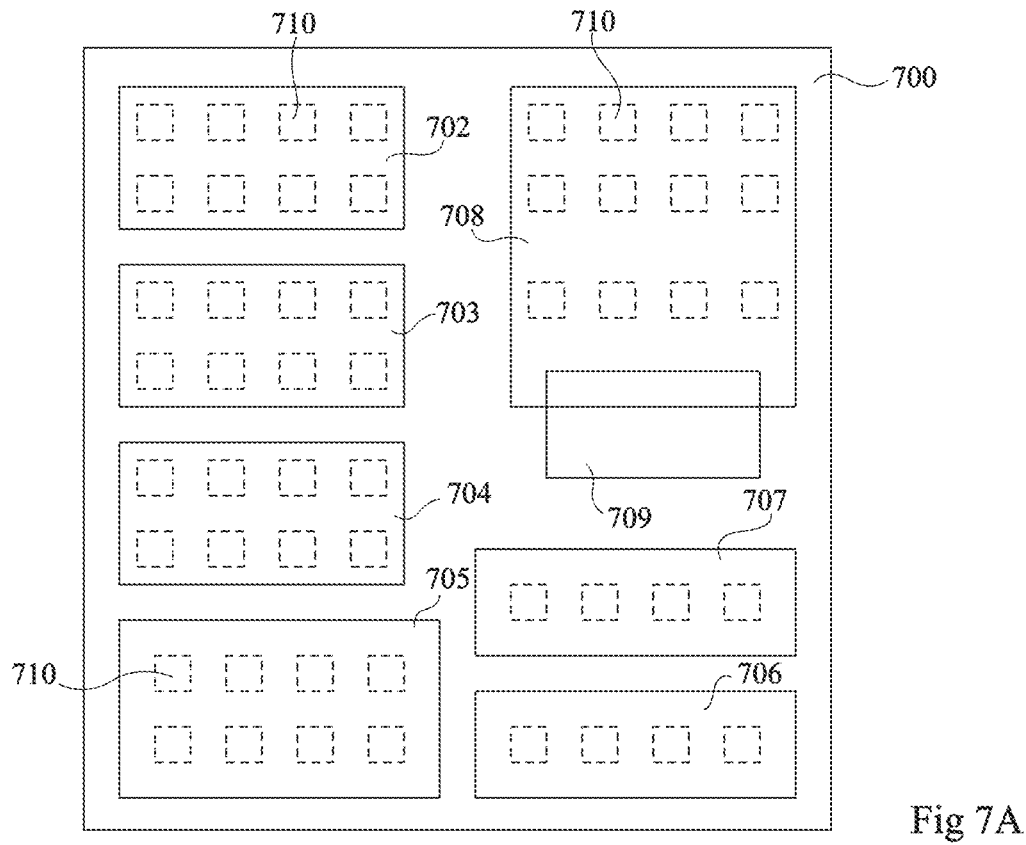
FIG. 7A illustrates a floorplan of a 3D circuit according to an example embodiment of the present disclosure.

FIG. 7A illustrates a 3D floorplan 700 representing an example of the pre-placement of eight macros 702 to 709. The macros 702 to 708 are for example to be positioned in an upper tier of the 3D circuit, and these macros for example correspond to macros as modified in operation 501 described above, which are superposable, encapsulated in a top interconnection layer of the device, and include 3D interconnection pads 710. The macro 709 is for example to be positioned in a lower tier of the 3D circuit, with the logic circuit. Therefore, to avoid any overlap with the logic circuit, the macro 709 is not modified to be superposable, but can superpose other macros. In the example of FIG. 7A, the macros 708 and 709 are partially superposed with each other.

Referring again to FIG. 5, in an operation 504, placement and post-placement optimization is then for example performed, based on the 3D floorplan generated in operation 503. During this step, the 3D interconnection pads of the cells/macros created on the top face of the device are treated as pins to be connected to pins of the logic circuit, and the circuit conception tool performs the placement of the cells of the logic circuit based on the locations of these 3D interconnection pads. The placement is for example based on known 2D placement algorithms that for example aim to place logic cells in a manner that reduces distances between connected cells in order to reduce wire lengths. The placement and post-placement optimization operation will now be described in more detail with reference to FIG. 7B.

Figure 7B:
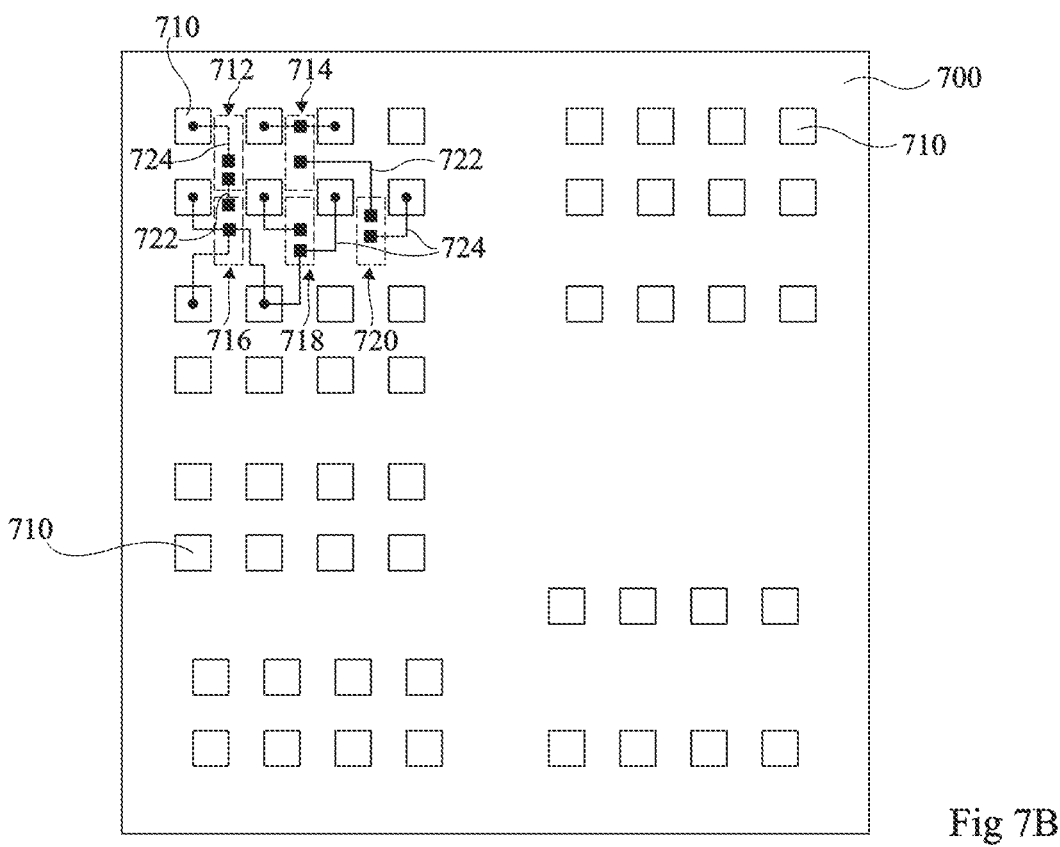
FIG. 7B illustrates the 3D circuit of FIG. 7A during placement and routing according to an example embodiment of the present disclosure.

FIG. 7B illustrates the 3D floorplan 700 of FIG. 7A during the placement operation 504 of FIG. 5. As illustrated, some logic cells 712, 714, 716, 718 and 720 have been placed, superposing the macro 702, in view of connections between these logic cells and the 3D interconnection pads of the macro 702 and of the macro 703.

Referring again to FIG. 5, in an operation 505, routing and post-routing optimization is for example performed for the one or more cells/macros and for the logic circuit. As explained above, the cells/macros of the design being encapsulated in the top layer of the device, the connections between pins of the logic cells and the 3D interconnection pads of the cells/macros are forced to pass through this top layer, thereby emulating 3D interconnections between logic cells and cells/macros. In other words, while connections between logic cells in the design may pass between lower levels of the metal layer, such as the levels M1, M2, M3 or M4, the connections between logic cells and cells/macros always for example pass through the top level of the device.

For example, referring again to FIG. 7B, a connection 722 between logic cells may pass through any metal layer, whereas connections 724 between logic cells and macros pass through the top layer of the device.

It should be noted that the placement, post placement optimization, routing, and post routing optimization operations 504 and 505 of FIG. 5 are all for example performed based on the original dimensions of the logic cells and macros of the circuit design, in other words without performing any shrinking.

Referring again to FIG. 5, in an operation 506, the 3D circuit layout, for example represented by a GDS or OASIS file associated with each level of the 3D circuit, is for example transmitted to a fabrication site for fabrication and/or the 3D circuit is fabricated based on the 3D circuit layer. The circuit layout of each tier of the 3D circuit is for example extracted from the 3D circuit layout generated in operations 504 and 505. For example, this is achieved by separating, from the 3D circuit layout, a first circuit layout providing a view of an upper tier of the 3D circuit comprising the final placement of the cells/macros, and a second circuit layout providing a view of the lower tier of the 3D circuit, comprising the logic cells, and any cells/macros positioned in the lower tier, with the superposed cells/macros removed.

Figure 8:
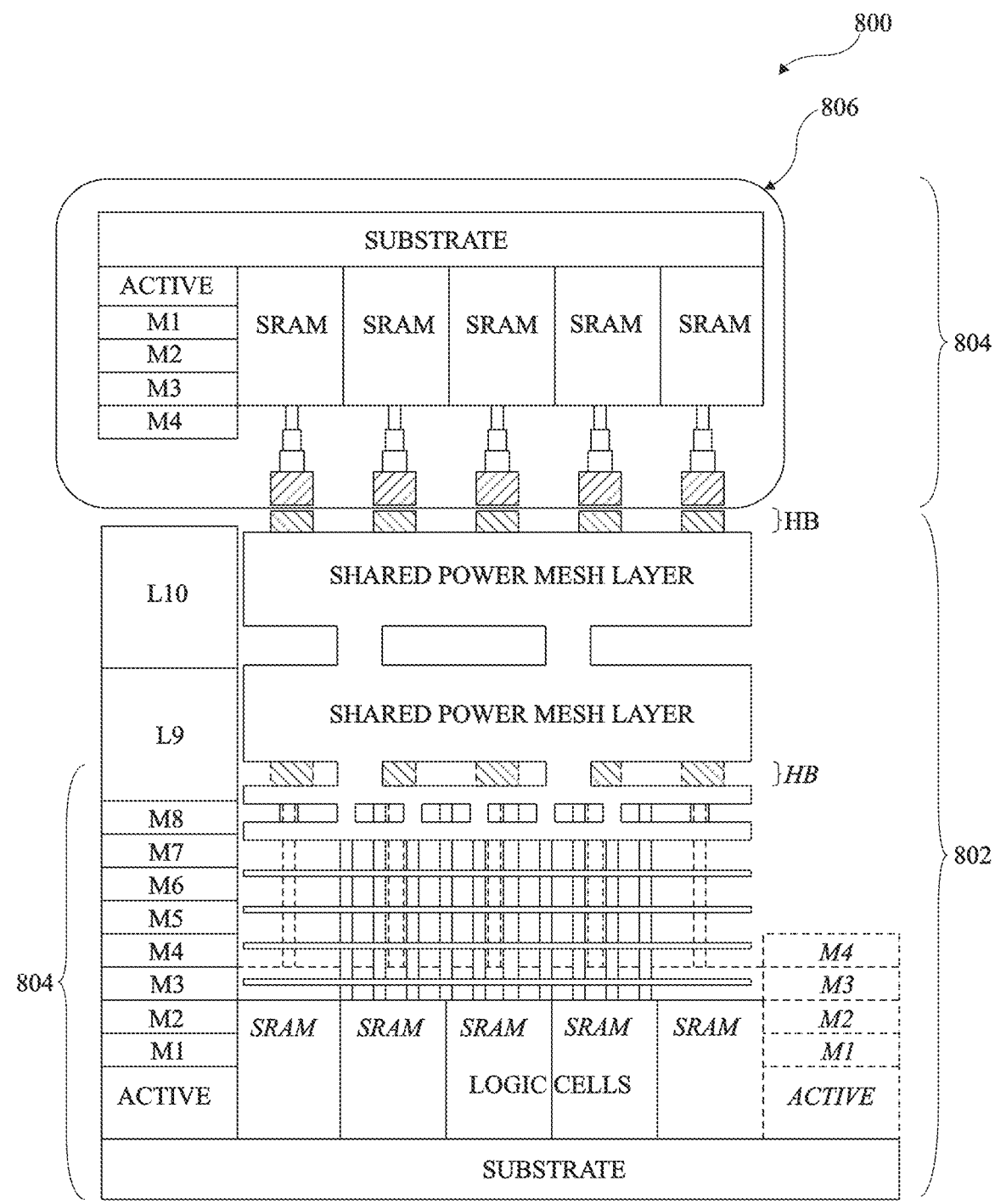
FIG. 8 is a cross-section view of a 3D circuit comprising a logic circuit superposed on a macro according to an example embodiment of the present disclosure.

FIG. 8 is a cross-section view of a portion 800 of a 3D circuit design resulting from the placement and routing operations 504 and 505 of FIG. 5. In particular, the circuit for example comprises a circuit 802 comprising the logic cells (LOGIC CELLS) of the device, including an active layer (ACTIVE), and a metal layer comprising metal levels (M1 to M6), levels M7 and M8, power mesh layers L9 and L10 (SHARED POWER MESH LAYER), which are for example shared by adjacent tiers of the 3D circuit, and a hybrid bonding layer (HB). A macro 804 is superposed over the circuit 802, the elements of the macro 804 that overlap the circuit 802 being shown with dashed lines and being referenced with text in italic font in FIG. 8. In the example of FIG. 8, the macro is an SRAM having an active layer (ACTIVE), a metal layer comprising four levels (M1 to M4) and a hybrid bonding layer (HB). FIG. 8 also represents the macro 804 in its encapsulation 806 and positioned face-to-face with the circuit 802, with the 3D interconnection pads of the HB layer of the circuit 802 contacting the 3D interconnection pads of the HB layer of the macro 804.

While the method of FIG. 5 is based on an encapsulation of some of the circuits in a single interconnection level, such as the hybrid bonding layer of the 2D circuit design, an alternative approach involves defining additional metal levels, as will now be described in more detail with reference to FIGS. 9 to 11.

Figure 9:
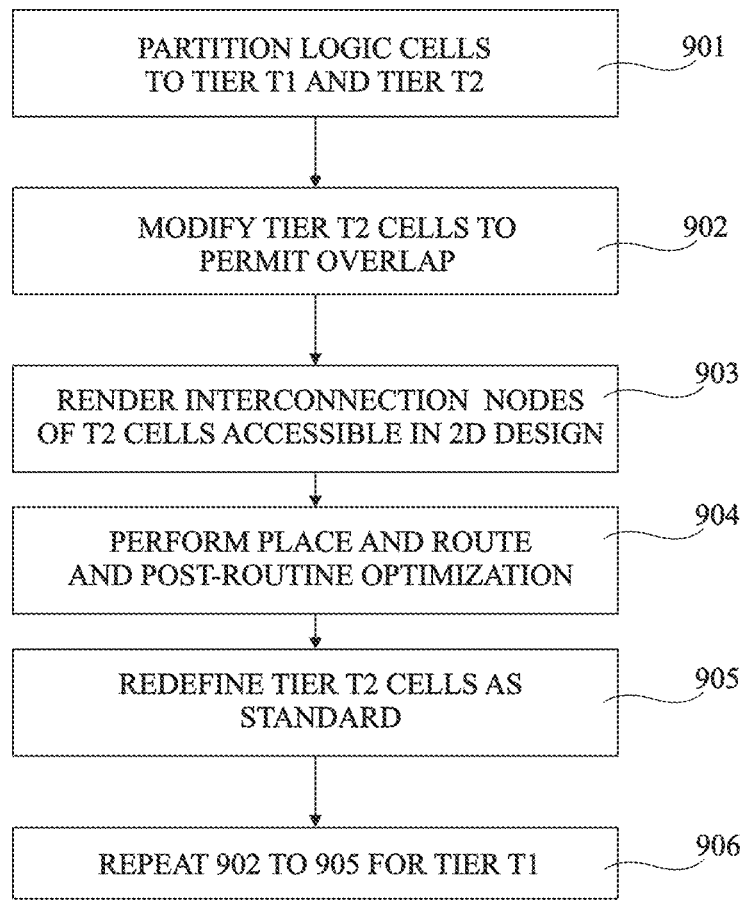
FIG. 9 is a flow diagram representing operations in a method of 3D circuit conception according to a further example embodiment of the present disclosure.

FIG. 9 is a flow diagram illustrating a further example of operations in a method of 3D circuit conception according to an example embodiment of the present disclosure. Like the example of FIG. 5, the 3D circuit is for example defined by a circuit layout of each tier of the 3D circuit, represented for example in the GDS (General Design Specification) or OASIS (Open Artwork System Interchange Standard) format. The operations of the method of FIG. 9 are for example implemented by the 3D circuit conception tool of FIG. 4, which for example operates based on a 2D circuit representation, comprising the circuit elements of two tiers superposed with respect to each other.

Like in the embodiment of FIG. 5, it is assumed that initially the standard cells, and macros, if any, of the circuit design are represented by the circuit design files 410 of FIG. 4, and these files have been loaded to the memory 408. The circuit design files 410 may for example be in Verilog or VHDL (VHSIC Hardware Description Language, where VHSIC stands for Very High Speed Integrated Circuit) and may for example include one or more LEF, files, one or more LIB timing files, a DEF file and one or more RTL files.

In an operation 901, the logic cells of the circuit design, and any macros, are for example partitioned among the tiers of the 3D circuit design. The example of FIG. 9 is based on a 3D circuit design having two tiers, although as described in more detail below, the method could be applied to a 3D circuit having more than two tiers. In some embodiments, this partitioning is performed automatically by the circuit conception tool. For example, the tiers of the 3D circuit may be formed of different technologies, one of which is optimized for speed, and the other is optimized in another way, such as for low voltage or low power consumption. The logic cells in relatively critical paths of the circuit are for example assigned to the tier that is optimized for speed. Alternatively, the partitioning could be performed manually, or the library containing the circuit design could already include an attribute for each logic cell and/or macro indicating its attributed tier. The partitioning is for example performed such that the surface area of the logic cells and macros, if any, assigned to each tier is substantially equal.

In an operation 902, the cells of one tier, such as the tier T2, are modified in the library in order to permit them to be superposed by the cells of the other tier. For example, this could involve defining an overlap layer in each logic cell and in each macro, if any, of the tier T2, as described above. Alternatively, this could involve changing the class of each logic cell, and of each macro, if any, of the tier T2 to define it as being a cover cell.

In an operation 903, the interconnection nodes of the logic cells, and macros, if any, of the tier T2 are rendered accessible in a 2D circuit representation of the circuit design in order to permit place and route between these cells/macros of the tier T2 and the cells/macros of the tier T1. In the embodiment of FIG. 5, this was achieved by encapsulating the cells/macros of the tier T2 in an interconnection layer of the 2D circuit representation of the circuit design. In the embodiment of FIG. 10, this is for example achieved by extending the number of metal levels in the 2D circuit representation and for example encapsulating the cells/macros of the tier T2 in one of the metal interconnection levels. This will now be described in more detail with reference to FIGS. 10 and 11.

Figure 10:
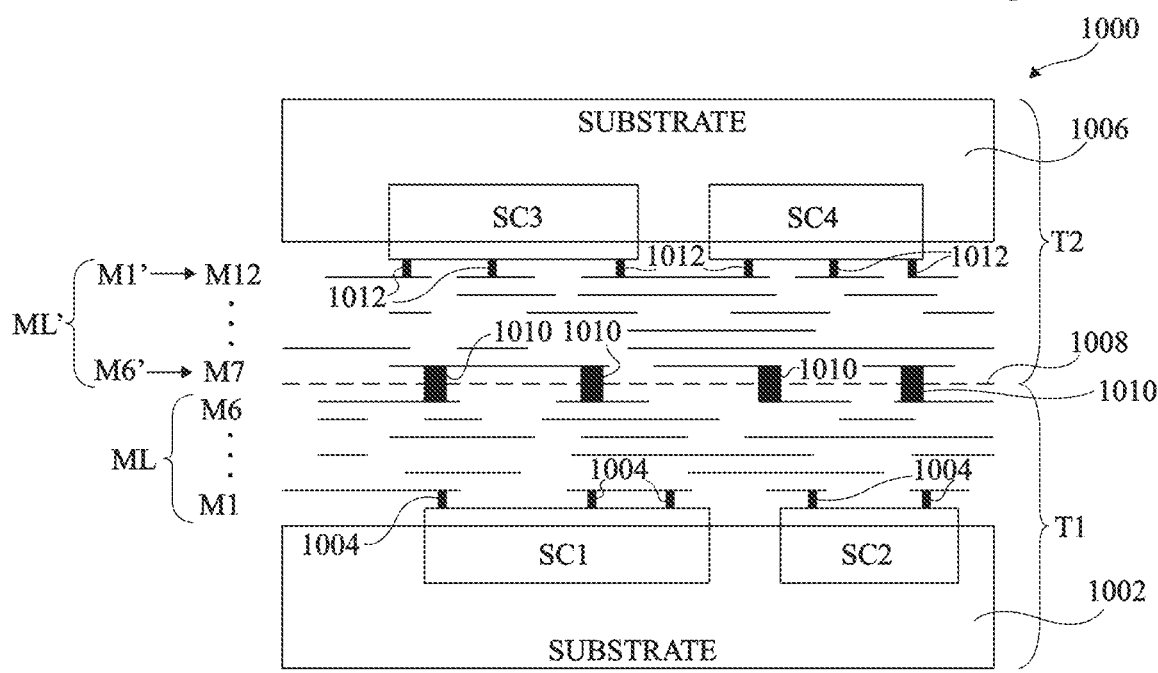
FIG. 10 is a cross-section view of a 3D circuit having two tiers according to a further example embodiment of the present disclosure.

FIG. 10 is a cross-section view of a 3D circuit 1000 comprising two tiers T1 and T2 stacked in a face-to-face arrangement.

The tier T1 has a substrate (SUBSTRATE) 1002, within and on which transistors and other devices are formed, and a metal layer ML having, in the example of FIG. 10, six metal levels M1 to M6. For ease of illustration, vias interconnecting the metal tracks of the metal levels M1 to M6 are not shown. The tier T1 also comprises standard cells SC1 and SC2, each having interconnection nodes 1004 connected to metal tracks formed in the metal level M1.

The tier T2 has a substrate (SUBSTRATE) 1006, within and on which transistors and other devices are formed, and a metal layer ML' having, in the example of FIG. 10, six metal levels M1' to M6'. However, as indicated in FIG. 10, during conception of the 3D circuit, these six metal levels M1' to M6' are for example respectively redefined as further metal levels M12 to M7 of the 2D circuit representation. Thus, the cells of the tier T1 each have interconnection nodes 1004 in one of a first set of metal levels M1 to M6 corresponding to the metal levels M1 to M6 of the tier T1, and the cells of the tier T2 each have interconnection nodes 1012 in one of a second set of metal levels M7 to M12 corresponding to the metal levels M6' to M1' of the tier T2.

For ease of illustration, vias interconnecting the metal tracks of the metal levels M7 to M12 are not shown in FIG. 10, except between the metal levels M6 and M7. The interface between the levels M6 and M7, represented by a dashed line 1008, corresponds to the interface between the metal level M6 of the tier T1 and the metal level M6' of the tier T2 in the final 3D circuit. Thus, the spacing between the metal levels M6 and M7 in FIG. 10 corresponds for example to the spacing in the final structure, and interconnections 1010 are for example defined, implemented in part by the hybrid bonding layers of the tiers.

The tier T2 also comprises standard cells SC3 and SC4, each having interconnection nodes 1012 connected to metal tracks formed in the metal level M12. During the 3D circuit conception, the cells/macros of the tier T2 are for example encapsulated in the metal level closest to their interconnection nodes, in other words their input/output nodes. For example, the cells SC3 and SC4 are encapsulated in the metal level M12 of the 2D circuit representation.

By defining, during the 3D circuit conception, the standard cells SC3 and SC4 as cells that can be superposed, and by encapsulating them and defining their interconnection nodes as being in the metal level M12 of the 2D circuit representation, the circuit conception tool is able to perform placement and routing between the standard cells of each tier, using all of the available metal levels, and without modifying the dimensions of any of the cells.

Referring again to FIG. 9, a circuit synthesis operation (not illustrated) similar to the operation 502 of FIG. 5 may then be implemented, and then in an operation 904, placement and routing of the logic cells is performed. For example, the placement involves placing standard cells, such as the cells SC1 and SC2 of FIG. 10, in the 2D design, and placing the modified cells, such as the cells SC3 and SC4, superposed over the standard cells. During this placement and routing operation, the positioning of the modified cells is for example decided by the tool while placing the standard cells in the tier T1, corresponding to the active layer of the T2 circuit representation. Indeed, the modified cells are for example placed by the circuit conception tool in the best manner as regards the routing of these cells to the standard cells in the tier T1. While the circuit conception tool for example ensures no overlap between the standard cells, and macros if any, in the tier T1 (i.e. the active layer of the T2 circuit representation), it does not prevent overlap between the modified cells in the overlap layer or cover class. Thus, the placement of the modified cells is not for example a legal placement. As described in more detail below, in some embodiments, a legal placement can be obtained by switching again the attributes of the modified cells so that they again become standard cells, and modifying the already placed standard cells to allow them to be superposed.

The routing for example involves defining interconnections passing through the metal levels and interconnecting the standard cells and modified logic cells, based on the locations of the interconnection nodes 1004, 1008 of the cells. This routing is defined not only in the original metal levels ML of the 2D circuit design, e.g. the levels M1 to M6 of FIG. 10, but also in the additional metal levels ML', e.g. the levels M7 to M12 of FIG. 10, which represent the levels of the tier T2.

Post-routing optimization for example involves optimizing the placement based on the defined routing. For example, it may be possible to shorten one or more wires between logic cells by modifying the placement of one or more of the logic cells, such as one of the standard cells SC1, SC2, SC3 or SC4 of FIG. 10.

In an operation 905, the modified tier T2 cells, such as the cells SC3 and SC4 in the example of FIG. 10, are re-classed as standard cells, for example by changing their class from cover cell to standard cell, and a 2D circuit layout of the tier T2 is generated based on the determined placement of these cells. Furthermore, the metal levels M7 to M12 respectively become the metal levels M6 to M1 of the tier T2 circuit design.

In some embodiments, the final circuit layouts of the tiers T1 and T2 of the 3D circuit are defined based on only one iteration of the operations 902 to 905. Alternatively, one or more further iterations may be performed, for example with the tiers inversed. In particular, whereas in the operation 902 the logic cells/macros of the tier T2 were modified to permit overlap, in an inversed iteration, the cells/macros of the tier T2 remain as standard cells, and the cells/macros of the tier T1 are modified to permit overlap. Furthermore, in the operation 903, the nodes of the tier T1 are then rendered accessible in the 2D circuit representation, the cells/macros of the tier T1 are for example encapsulated in the metal level M1 of the 2D circuit representation, and the placement and routing operations of operation 904 are performed again based on an initial placement and routing defined after the first iteration of the operations 902 to 905. In order words, the placement of the standard cells/macros of the tier T1 that was determined in the first iteration is fixed so that it is no longer modified during the second iteration, only the placement of the tier T2 cells/macros will be modified. The tier T1 cells are then redefined, in the operation 905, as standard cells, and the metal levels ML' of the tier T2 will become the metal levels of the tier T1.

In some embodiments, further iterations based on the switching of the tier T1 cells/macros and tier T2 cells/macros as the modified cells are then performed until a final 3D placement has been reached for the cell placement and routing.

While the example of FIG. 10 is based on a face-to-face stacking of two tiers T1 and T2, the method of FIG. 9 could equally be applied to other types of tier stacking, and to more than two tiers. An example using a face-to-back stacking of three tiers will now be described with reference to FIG. 11.

Figure 11:
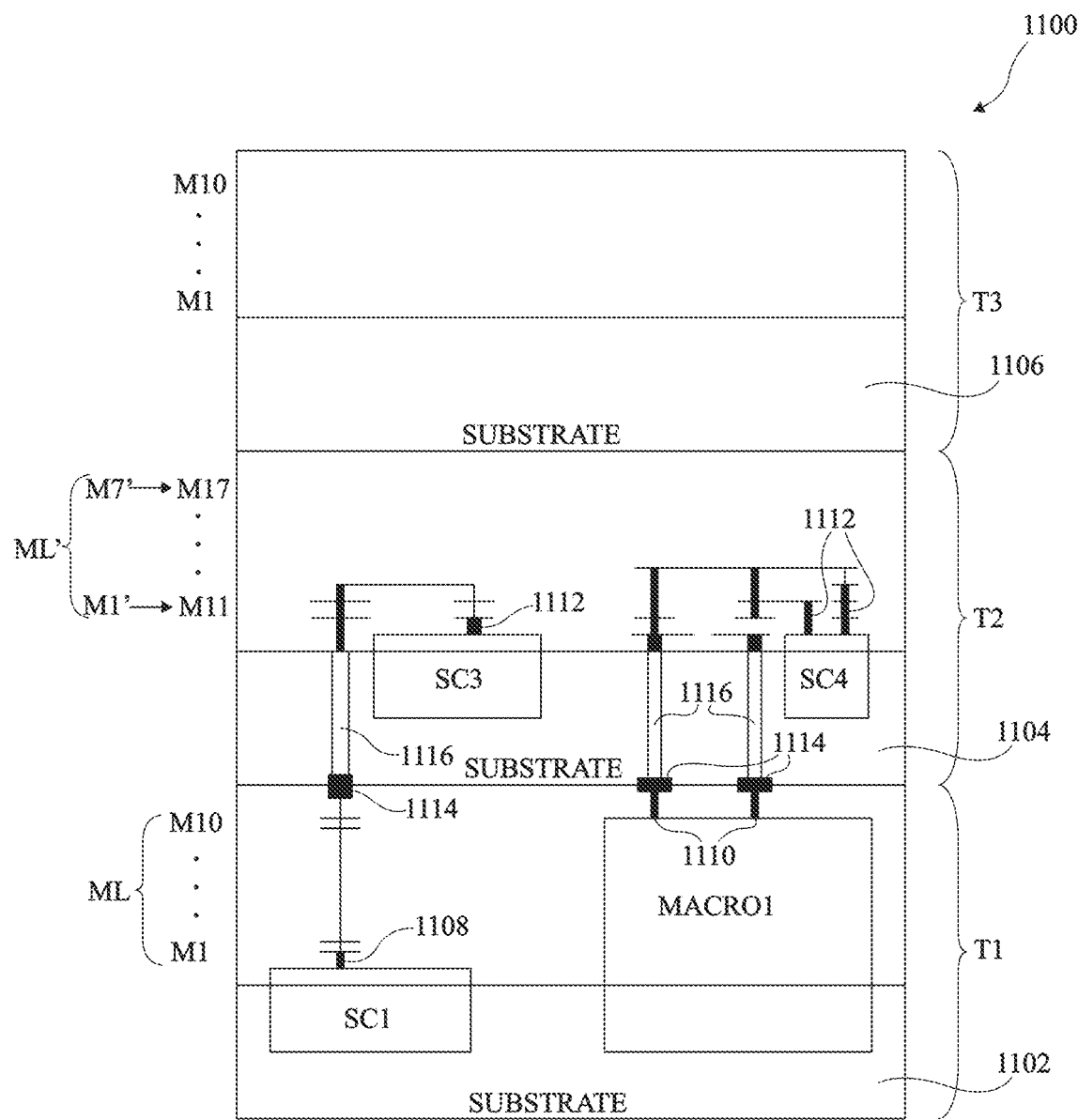
FIG. 11 is a cross-section view of a 3D circuit having three tiers according to yet a further example embodiment of the present disclosure.

FIG. 11 is a cross-section view of a 3D circuit 1100 comprising tiers T1, T2 and T3 respectively comprising substrates (SUBSTRATE) 1102, 1104, 1106 formed for example of silicon.

The tier T1 for example comprises a standard cell SC1 having an interconnection node 1108 in the metal level M1, and a macro MACRO1 having interconnection nodes 1110 in the metal level M10.

The tier T2 for example comprises standard cells SC3 and SC4 each having interconnection nodes 1112 in the metal level M1' of the tier T2.

Cells in the tier T3 have not been illustrated.

During circuit conception of the 3D circuit 1100, a first iteration of the operations 902 to 905 of FIG. 9 is for example implemented according to which the cells/macros of the tier T1 are defined as standard, and the cells/macros of the tiers T2 and T3 are modified to permit overlap. For example, in some embodiments, the cells/macros of the tier T1 represent substantially one third of the total surface area of the circuit design, and the cells/macros of the tiers T2 and T3 represent substantially two thirds of the total surface area of the circuit design. Furthermore, in the example of FIG. 11, the tier T1 has metal levels M1 to M10, and the tier T2 has metal levels M1' to M7'. However, during the first iteration of the circuit conception, the metal levels M1' to M7' of the tier T2 are for example redefined as additional metal levels M11 to M17 of the 2D circuit representation. The interface between the metal levels M10 and M11 in the example of FIG. 11 comprises interconnection pads 1114 between the tier T1 and an underside of the substrate 1104 of the tier T2, the pads 1114 being formed for example in a hybrid bonding layer, and vias 1116, for example formed by TSVs (through-silicon vias) traversing the substrate 1104. Thus, during routing of the design of FIG. 11, the 2D conception tool for example routes cells/macros of the tier T1 with cells/macros of the tier T2, using the metal levels M1 to M17, including vias 1116 between the metal levels M10 and M11. Similarly, while not shown in FIG. 11, the metal levels M1 to M10 of the tier T3 are for example redefined as levels M18 to M27 of the 2D circuit representation, and vias (not illustrated) for example traverse the substrate 1106 of the tier T3. This first iteration therefore for example permits a placement of the cells/macros in the active layer of the 2D design representation corresponding to the tier T1, and an approximate positioning of the cells/macros in the tiers T2 and T3. Furthermore, the routing in the tier T1 is for example determined, whereas the routing in the tiers T2 and T3 is approximate.

A second iteration of the operations 902 to 905 of FIG. 9 is for example implemented according to which the cells/macros of the tier T2 are redefined as standard, and the cells/macros of the tiers T1 and T3 are modified to permit overlap. However, the placement of the cells/macros in the tier T1, and the routing in the metal levels of the tier T1, determined during the first iteration, are for example fixed so that they are no longer modified during the second iteration. Thus, the placement of the standard cells in the tier T2 can be legally defined during the second iteration, and the routing in the metal levels of the tier T2 can also be determined, whereas the placement and routing in the tier T3 remains approximate.

A third iteration of the operations 902 to 905 of FIG. 9 is for example implemented according to which the cells/macros of the tier T3 are redefined as standard, and the cells/macros of the tiers T1 and T2 are modified to permit overlap. However, the positions of the cells/macros in the tiers T1 and T2, and the routing in the metal levels of the tiers T1 and T2, are for example fixed so that they are no longer modified during the third iteration. Thus, the placement of the standard cells in the tier T3 can be legally defined during the third iteration, and the routing in the metal levels of the tier T3 can also be determined.

In some embodiments, one or more further iterations of the method of operations 902 to 905 of FIG. 9 are then implemented in order to finely adjust the placement and routing in one or more of the tiers T1, T2 and T3. For example, the first, second and third iterations described above are repeated at least once.

While the example of FIG. 11 is based on a 3D circuit design having three tiers, it will be apparent to those skilled in the art that the described principles could be applied to a 3D circuit design having more than three tiers. Indeed, for a 3D circuit design of T tiers, each iteration of the method for example involves defining cells/macros attributed to one tier, and corresponding to approximately 1/T of the total surface area of the design, as standard cells, while the remaining cells/macros are modified to permit overlap, and then repeating for each tier one or more times.

An advantage of the embodiments described herein is that they overcome principal challenges in the conception, and in particular the placement and routing, of a 3D circuit design using a 2D circuit conception tool. In particular, the method and system described herein permit placement and routing to be optimised by the conception tool by defining at least some cells as being capable of superposing other cells, and rendering interconnection nodes of these cells accessible in the 2D circuit design. In some embodiments, this is achieved by performing the routing based on the location of the 3D interconnection pads of the macros of the design, which are superposed on the logic circuit of the device. Alternatively, it is achieved by defining interconnection nodes of the cells in one or more additional metal levels added to the 2D circuit design to represent metal levels of a further tier.

Having thus described at least one illustrative embodiment, various alterations, modifications and improvements will readily occur to those skilled in the art. For example, while examples have been described based on a face-to-face interface between tiers of a 3D circuit, it will be apparent to those skilled in the art that this method could be adapted to a face-to-back or back-to-back interface by defining one or more regions in which logic cells cannot be placed in order to provide space for through-silicon vias, such as the vias 110 or 112 of FIG. 1, or the vias 208 of FIG. 2.

Furthermore, it will be apparent that while examples have been described based on 3D circuits comprising just two tiers, the techniques described herein could be equally applied to 3D circuits comprising three or more tiers in which one of the tiers, such as the bottom tier, comprises logic cells, and optionally one or more macros, and the other tiers comprise only macros. During the pre-placement of these macros, the operator for example ensures that macros of a same tier are not superposed, and that space is kept free for appropriate TSVs.

Furthermore, while embodiments have been described in which cells are modified to enable them to be superposed over standard cells or other circuits, in alternative embodiments, the standard cells or other circuits could be modified to permit them to be superposed.

Furthermore, it will be apparent to those skilled in the art that the various features described in relation with the various embodiments could be combined, in alternative embodiments, in any combination.

The invention claimed is:

1. A method of 3D circuit conception comprising:
providing, to a circuit conception tool, circuit design files representing a 3D circuit design including one or more first circuit elements attributed to a first tier of the 3D circuit and one or more second circuit elements attributed to a second tier of the 3D circuit;
modifying, by the circuit conception tool, a property of the one or more first and/or second circuit elements to permit any of the second circuit elements to superpose, or be superposed by, any of the first circuit elements;
performing, by the circuit conception tool, placement and routing of the 3D circuit design to generate a 3D circuit layout of the 3D circuit design, wherein the placement and routing is based on a 2D circuit representation, interconnection nodes of the one or more second circuit elements being defined in one or more interconnection levels of the 2D circuit representation, the placement comprising placing one or more of the second circuit elements to at least partially superpose one or more of the first circuit elements and the routing comprising routing connections between the one or more first circuit elements and the one or more second circuit elements via the interconnection nodes defined in the one or more interconnection levels; and
generating a final 3D circuit layout by extracting, from the 3D circuit layout, a first circuit layout of the first tier comprising the one or more first circuit elements and a second circuit layout of the second tier comprising the one or more second circuit elements, wherein interconnection nodes of the one or more first circuit elements are each defined in one of a first set of metal levels of the 2D circuit representation corresponding to metal levels of the first tier; and interconnection nodes of the one or more second circuit elements are each defined in one of a second set of metal levels of the 2D circuit representation corresponding to metal levels of the second tier so that routing between the interconnection nodes of the one or more first circuit elements and the interconnection nodes of the one or more second circuit elements can be performed.

2. The method of claim 1, further comprising:

transmitting the final 3D circuit layout of the 3D circuit design to a manufacturing site for fabrication.

3. The method of claim 1, further comprising fabricating a 3D circuit design based on the final 3D circuit layout.

4. The method of claim 1, further comprising, after performing placement and routing, performing by the circuit conception tool, post-routing optimization of the placement of at least one of the first or second circuit elements.

5. The method of claim 1, wherein modifying the property of the one or more first and/or second circuit elements to permit any of them to superpose, or be superposed by, any of the first circuit elements comprises defining an overlap layer in each of the one or more second circuit elements, the overlap layer defining a region of each second circuit element that can be superposed by other circuits.

6. The method of claim 1, wherein modifying the property of the one or more first and/or second circuit elements to permit any of them to superpose, or be superposed by, any of the first circuit elements comprises defining each of the second circuit elements as a cover class.

7. The method of claim 1, further comprising, prior to providing the circuit design files to the circuit conception tool, attributing, by the circuit conception tool, the one or more first circuit elements to the first tier of the 3D circuit and one or more second circuit elements to the second tier of the 3D circuit.

8. The method of claim 1, wherein the interconnection nodes of the one or more second circuit elements are 3D interconnection PADs, and the one or more interconnection levels is a hybrid bonding layer.

9. The method of claim 1, wherein the at least one first circuit element comprises one or more macros, and the at least one second circuit element comprises one or more logic cells.

10. The method of claim 9, wherein the one or more macros are defined in the circuit design files as being encapsulated in a top level in which the 3D interconnection pads are present.

11. The method of claim 9, wherein the 3D circuit layout comprises one or more tiers comprising only said macros.

12. The method of claim 9, further comprising, prior to performing the placement and routing, a synthesis operation during which a functional definition of a logic circuit of the 3D circuit design is translated into a netlist defining said one or more logic cells.

13. The method of claim 12, wherein said synthesis operation is based on a pre-placement of the one or more macros in a 3D floorplan.

14. A circuit conception system comprising:
one or more processors; and
one or more memories storing software instructions that cause the one or more processors to implement the method of claim 1.

15. A non-transitory storage medium storing software instructions that cause the method of claim 1 to be implemented when the instructions are executed by one or more processors.

* * * * *